Figure 1:
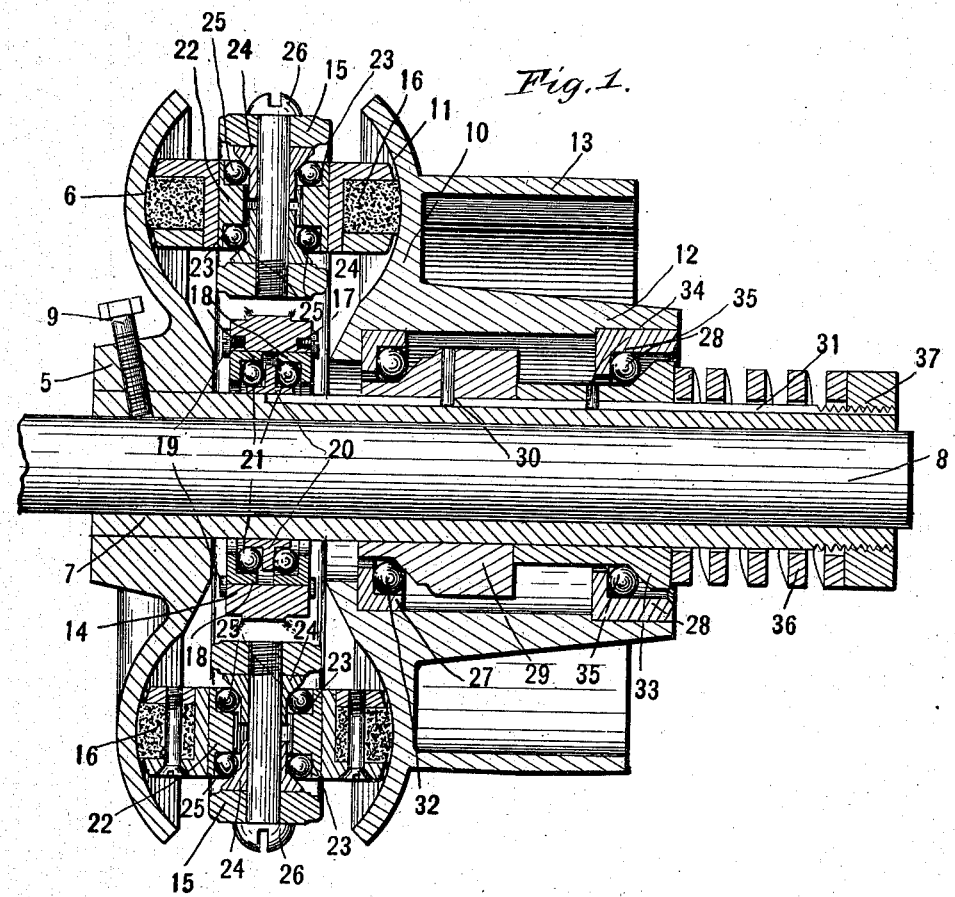

No. 681,145. Patented Aug. 20, 1901.
F. W. SPACKE.
SELF CONTAINED SPEED VARYING PULLEY.
(Application filed Apr. 24, 1901.)
(No Model.) 2 Sheets—Sheet 1.

Witnesses
Frank A. Fahle
Bertha M. Ballard

Inventor
Fred W. Spacke
by
Arthur M. Hood
Attorney

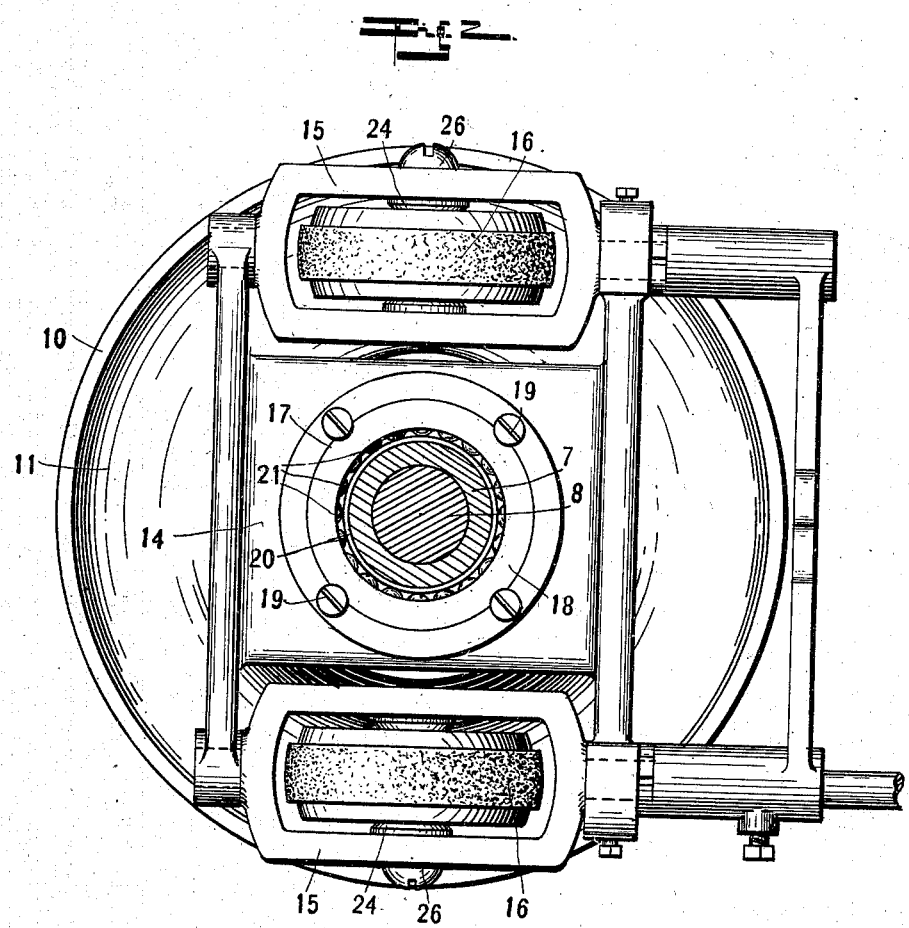

United States Patent Office.

FRED W. SPACKE, OF INDIANAPOLIS, INDIANA, ASSIGNOR TO SPEED CHANGING PULLEY COMPANY, OF SAME PLACE.

SELF-CONTAINED SPEED-VARYING PULLEY.

SPECIFICATION forming part of Letters Patent No. 681,145, dated August 20, 1901.

Application filed April 24, 1901. Serial No. 57,193. (No model.)

*To all whom it may concern:*

Be it known that I, FRED W. SPACKE, a citizen of the United States, residing at Indianapolis, in the county of Marion and State of Indiana, have invented a new and useful Self-Contained Speed-Varying Pulley, of which the following is a specification.

My invention relates to an improvement in the bearings of a speed-varying pulley such as that shown in my application Serial No. 33,654.

The object of my invention is to provide ball-bearing supports for the several rotating parts of the speed-varying pulley mentioned of such character that the parts will rotate with a minimum amount of friction and such that the proper distance between the two disks may be maintained automatically, at the same time maintaining the proper adjustment of the bearings within the driving-disk.

The accompanying drawings illustrate my invention.

Figure 1 is a central axial section. Fig. 2 is a side elevation with one of the disks removed.

In the drawings, 5 indicates the driven disk, which is provided with an annular arc-shaped track 6 and a hollow axial sleeve 7, adapted to receive a shaft 8, such as the driving-shaft of a throttling-governor, and be secured thereto by means of a set-screw 9. Rotatably mounted upon sleeve 7 is a driving-disk 10, provided with an annular arc-shaped track 11, which is the complement of the track 6. Disk 10 is provided with a central hub 12 and a driving-pulley 13, which is preferably formed integral with the disk. Revolubly mounted upon sleeve 7 is a frame 14, upon which is pivoted a pair of yokes 15, which yokes are supported in the frame upon axes parallel to each other, but at right angles to the axis of the sleeve 7. Revolubly mounted in each yoke 15 is a transmission-wheel 16, which rotates about an axis at right angles to the axis of its yoke 15.

All the parts described are similar in construction and arrangement to the corresponding parts described and claimed in my application before mentioned, and my present invention consists in the peculiar manner of supporting the several parts.

Frame 14 is provided with an axial bore 17, in each end of which is mounted a ball-race 18, said race being adjustably held in position by means of screws 19. Mounted between the two races 18 is a T-shaped collar 20, which forms a pair of ball-races coöperating with the races 18, and mounted in said races are two sets of balls 21. Collar 20 is provided with an axial bore of such size as to fit easily over sleeve 7.

Each wheel 16 is bored axially to fit snugly, but to be axially movable upon, a bushing 22, provided at each end with an annular ball-race 23, each of which coöperates with a cone 24, a series of balls 25 being placed between each race 23 and its coöperating cone 24. The distance between the outer ends of cones 24 when the balls 25 are in position is substantially equal to the distance between the inner faces of the two sides of yoke 15, and the parts are held in position by means of a screw 26 passing through said arms and through the cones. A limited adjustment of the cones toward each other may be had by tightening screw 26, so as to spring the arms of the yoke 15 together. Wheel 16 being axially movable upon the bushing 22, it will easily center itself between the two tracks 6 and 11.

Pressed into hub 12 of disk 10 are two ball-races 27 and 28, said races lying in opposite ends of the hub, but facing in the same direction. Coöperating with race 27 is a cone 29, which is mounted upon sleeve 7, so as to be axially movable thereon, a rotation of said cone upon the sleeve being prevented by means of a key 30 projecting into a keyway 31, formed in the sleeve. Mounted between race 27 and cone 29 is a series of balls 32. Coöperating with race 28 is a cone 33, which is capable of axial movement upon sleeve 7 and is provided with a pin 34, projecting into keyway 31. Mounted between race 28 and cone 33 is a series of balls 35. Cone 33 is of sufficient length to just touch cone 29 when the balls 32 and 35 are in position. Surrounding the outer end of sleeve 7 is a spring 36, one end of which engages the outer end of cone 33 and the other end of which is engaged by a nut 37, threaded upon the outer end of sleeve 7. It will be noticed that spring 36 operates to keep both cones 33 and 29 up to their coöperating balls and also serves to urge disk 10 with any desired force into engagement with the transmission-wheels 16.

I claim as my invention—

1. In a self-contained speed-varying pulley, the combination with a disk provided with an axial sleeve, of a second disk surrounding said sleeve, a pair of ball-races, facing in the same direction, carried by said second disk, a pair of cones coöperating with said races, suitable balls mounted between said races and cones, a transmission-wheel mounted between the two disks, and a spring engaging one of said cones and the axial sleeve and normally urging the said cones into engagement with their coöperating balls and drawing the two disks into engagement with the transmission-wheel.

2. In a self-contained speed-varying pulley, the combination with a pair of coöperating disks one revolubly mounted upon the other, of a frame supported between said disks, a yoke supported in said frame and revoluble about an axis at right angles to the axis of the disk, an axle carried by the yoke at an angle to the axis of said yoke, a sleeve or bushing rotatably mounted upon said axle, and a transmission-wheel mounted upon said bushing and axially movable thereon.

3. In a speed-varying mechanism, the combination with a pair of coöperating disks, of a yoke mounted between said disks, of an axle carried by said yoke, and a transmission-wheel revoluble and axially movable upon said axle.

4. In a speed-varying mechanism, the combination with a pair of coöperating disks, of a yoke mounted therebetween, an axle carried by said yoke, a bushing revolubly mounted upon said axle, and a transmission-wheel mounted upon said bushing and axially movable thereon.

5. In a speed-varying mechanism, the combination with a pair of coöperating disks, of a yoke mounted between said disks, a transmission-wheel mounted between the arms of the yoke, a bushing mounted in said wheel and axially movable therein, a pair of ball-races carried by said bushing, a pair of cones coöperating therewith, balls mounted between said races and cones, and a bolt passing through the cones and the arms of the yoke.

6. In a self-contained speed-varying pulley, the combination with a disk provided with an axial sleeve, of a second disk surrounding said sleeve, a pair of ball-races, facing in the same direction, carried by said second disk, a pair of independent cones each coöperating with one of said races and contacting at their adjacent ends, suitable balls mounted between said races and cones, a transmission-wheel mounted between the two disks, and a spring engaging the outer cone and the axial sleeve and normally urging said cones into engagement with their coöperating balls and drawing the two disks into engagement with the transmission-wheel.

7. In a self-contained speed-varying pulley, the combination with a disk provided with an axial sleeve, of a second disk surrounding said sleeve, a pair of ball-races, facing in the same direction, carried by said second disk, a pair of cones mounted upon the sleeve and coöperating with said races, suitable balls mounted between said races and cones, a collar axially movable upon the sleeve between the two disks, a frame surrounding said collar, balls mounted between said collar and frame, a yoke pivotally mounted upon said frame, a transmission-wheel mounted in said yoke, a bushing mounted in said transmission-wheel and axially movable therein, an axle carried by said yoke, and a ball-bearing between said axle and bushing.

FRED W. SPACKE.

Witnesses:
ARTHUR M. HOOD,
BERTHA M. BALLARD.